United States Patent [19]

Staendeke et al.

[11] 4,315,897
[45] Feb. 16, 1982

[54] STABILIZED RED PHOSPHORUS AND PROCESS FOR ITS MANUFACTURE

[75] Inventors: Horst Staendeke, Erftstadt; Wilhelm Adam, Neuisenburg; Franz-Josef Dany; Joachim Kandler, both of Erftstadt, all of Fed. Rep. of Germany

[73] Assignee: Hoechst Aktiengesellschaft, Fed. Rep. of Germany

[21] Appl. No.: 205,627

[22] Filed: Nov. 10, 1980

[30] Foreign Application Priority Data

Nov. 8, 1979 [DE] Fed. Rep. of Germany ....... 2945118

[51] Int. Cl.³ .................... C01B 25/01; C01B 25/02; C01B 25/04
[52] U.S. Cl. .................................. 423/274; 423/322; 252/400 R
[58] Field of Search ............... 423/265, 266, 274, 322; 252/397, 400 R

[56] References Cited

U.S. PATENT DOCUMENTS

| 2,359,243 | 9/1944 | Pernert | 23/223 |
| 2,635,953 | 4/1953 | Silverstein et al. | 52/2 |
| 4,210,630 | 7/1980 | Dany et al. | 423/322 |

FOREIGN PATENT DOCUMENTS

| 1567629 | 5/1970 | Fed. Rep. of Germany | 423/322 |
| 2622296 | 1/1977 | Fed. Rep. of Germany | . |
| 2625674 | 5/1977 | Fed. Rep. of Germany | . |
| 2631532 | 1/1978 | Fed. Rep. of Germany | . |
| 2647093 | 4/1978 | Fed. Rep. of Germany | . |
| 2705042 | 8/1978 | Fed. Rep. of Germany | . |
| 2655739 | 12/1978 | Fed. Rep. of Germany | . |
| 2632296 | 2/1979 | Fed. Rep. of Germany | . |
| 51-105996 | 9/1976 | Japan | 423/322 |

OTHER PUBLICATIONS

Gmelins Handbuch der Anorganischen Chemie Phosphor Teil B, p. 83.

Primary Examiner—O. R. Vertiz
Assistant Examiner—Gregory A. Heller
Attorney, Agent, or Firm—Connolly and Hutz

[57] ABSTRACT

The invention relates to stabilized, pulverulent red phosphorus, consisting of phosphorus particles having a particle size of at most about 2 mm, and an oxidation stabilizer which envelops the phosphorus particles in the form of a thin layer, wherein (a) the oxidation stabilizer is a combination of aluminum hydroxide and a hardened epoxide resin system having an epoxide equivalent weight of about 170 to 500,
(b) the total amount of the oxidation stabilizer is 0.1-5% by weight, based on the amount of red phosphorus, and
(c) the proportion of aluminum hydroxide is about 0.01 to 3% by weight, and the proportion of epoxide resin is about 0.09 to 4.99% by weight, in each case based on the amount of the red phosphorous.

10 Claims, No Drawings

STABILIZED RED PHOSPHORUS AND PROCESS FOR ITS MANUFACTURE

The invention relates to stabilized, pulverulent red phosphorus, the surface of the red phosphorus particles being covered with a thin layer of oxidation stabilizers, and to a process for its manufacture.

It has been described that red phosphorus undergoes a chemical surface reaction which involves oxidation and disproportionation with the resultant formation of various acids of phosphorus of oxidation levels +1 to +5, and phosphine.

As described in Gmelins Handbuch der anorganischen Chemie (Gmelins Handbook of Inorganic Chemistry), 8th Edition (1964), Volume "Phosphorus", part B, page 83, Verlag Chemie, Weinheim/Bergstrasse, aluminum hydroxide should conveniently be used for stabilizing red phosphorus. The aluminum hydroxide is precipitated onto the phosphorus particles by successive addition of aqueous 10% strength solutions of sodium hydrogen carbonate and aluminum sulfate with a temperature of 55° to 60° C. Next, the aqueous suspension is filtered and the filter residue is dried. This procedure is not fully satisfactory inasmuch as undesirably large amounts of aluminum hydroxide have to be used so as to produce a satisfactory stabilizing effect. Needless to say, this is a procedure contaminating phosphorus to an extent unacceptable for a wide variety of uses.

Another process for stabilizing red phosphorus, as described in U.S. Pat. No. 2,359,243, provides for red phosphorus to be suspended in an aqueous 0.04-N-solution of sodium aluminate, for air to be passed for 10 hours through the suspension, at 85°-90° C., for the whole to be filtered, washed with hot water and dried under vacuum.

Finally, it is known from U.S. Pat. No. 2,635,953 that apart from aluminum hydroxide, zinc hydroxide or magnesium hydroxide may also be used to stabilize red phosphorus.

The last-mentioned known processes do also not permit red phosphorus to be satisfactorily stabilized to oxidation with a minimum of stabilizer. In fact, the oxidation stabilizers described heretofore present an unsatisfactory thermal stability, water being split off at elevated temperatures. With respect to plastics which are to be processed on an extruder and have red phosphorus as a flameproofing agent incorporated therein, which in turn contains an oxidation stabilizer, it is generally accepted that the oxidation stabilizer should present thermal stability in the absence of any tendency to split off water or to undergo decomposition, even at temperatures above 300° C.

This is a disadvantageous effect which has also been encountered in the stabilization process described in German Offenlegungsschrift No. 2,622,296. In that process, the stabilizing effect is achieved by precipitating small amounts of metal salts of various acid orthophosphoric acid esters onto the surface of the red phosphorus.

The orthophosphoric acid metal salts suggested for use as stabilizers in German Offenlegungsschrift No. 2,631,532, produce material which has an inadequate stability to oxidation for a variety of uses.

The metal salts of phosphonic acids and phosphinic acids (cf. German Offenlegungsschrift No. 2,647,093 and German Offenlegungsschrift No. 2,632,296 respectively) admittedly produce good thermal stability and oxidation stability, but they are relatively expensive products and have to be used in proportions as high as 3–5% by weight.

As described in German Pat. No. 2,655,739 and German Offenlegungsschrift No. 2,705,042 it is possible for the stability to oxidation of red phosphorus to be effectively improved by applying a thin layer of a melamine/formaldehyde resin to the surface of the red phosphorus particles. However, these stabilizers prove unsatisfactory inasmuch as the stabilizing effect is largely lost if the stabilized phosphorus is stored under tropical conditions, that is to say at 50° C. and 100% relative atmospheric moisture, such as are simulated in the modified Indian Standard Test (IS 2012-1961).

Finally, German Pat. No. 2,625,674 discloses an agent which permits the use of red phosphorus in plastics, without hydrogen phosphide being liberated as a result of the processing temperature of the plastic and of the presence of small amounts of water or moisture in the plastic to be processed. The agent comprises epoxide resins, which envelope the phosphorus particles, the resins being used in proportions of 5–50% by weight.

We have now unexpectedly found that the stabilization of red phosphorus can be improved by replacing the epoxide resin by a mixture of an epoxide resin and aluminum hydroxide, of which a thin layer is applied to the surface of the red phosphorus.

The present invention relates more particularly to stabilized, pulverulent red phosphorus, consisting of phosphorus particles having a particle size of at most about 2 mm, and an oxidation stabilizer envelopping the phosphorus particles in the form of a thin layer, the phosphorus containing (a) as the oxidation stabilizer a combination of aluminum hydroxide and a hardened epoxide resin system having an epoxide equivalent weight of about 170 to 500, (b) the oxidation stabilizer in a total proportion of 0.1–5% by weight, based on the quantity of red phosphorus, and (c) the aluminum hydroxide in the red phosphorus in a proportion of about 0.01 to 3% by weight, and the epoxide resin in a proportion of about 0.09 to 4.99% by weight, in each case based on the quantity of red phosphorus.

A preferred embodiment of the invention provides for the epoxide resin to be an epoxide-phenolic resin, such as, for example, the reaction product of epichlorohydrin and 2,2-bis-(4-hydroxyphenyl)-propane (bisphenol A) or an epoxide ester.

The invention also relates to a process for the manufacture of stabilized pulverulent red phosphorus, which comprises introducing a water-soluble aluminum salt and an aqueous or alcoholic solution or dispersion of an epoxide resin and of a hardener into an aqueous suspension of the red phosphorus, establishing a pH-value within the range about 5 to 9, stirring the mixture for 1 to 3 hours at a temperature of 20° to 90° C., with precipitation of the aluminum hydroxide and hardening of the epoxide resin, and filtering the stabilized phosphorus and finally drying it at an elevated temperature.

Further preferred features of the present invention provide for the resin component to comprise:

(a) liquid epoxide resins which combine a very low to medium viscosity with a 100% reactivity and are hardenable with water-soluble or water-emulsifiable hardeners, or (b) unmodified, liquid 100% reactive reaction products of epichlorohydrin and bisphenol A, which are hardenable with water-soluble or water-emulsifiable hardeners, or (c) an aqueous epoxide-phenolic resin dispersion or water-emulsifiable, 100% reactive epoxide resin ester, either of which is hardenable with water-soluble or water-emulsifiable hardeners.

The epoxide resins are hardened in a conventional manner, for example in an aqueous phase at a temperature of 20°–90° C. and while maintaining a pH value of the aqueous phase of 5–9; suitable hardeners include water-soluble, internally modified polyamines or water-emulsifiable polyaminoamides.

The red phosphorus stabilized in accordance with the invention, and the process for its manufacture, compare favorably with the prior art inasmuch as the stabilizer is thermally stable and is furthermore so effective that even the addition of very small amounts results in red phosphorus of adequate stability for a wide variety of uses.

The invention is illustrated by the following examples.

EXAMPLE 1

500 ml of an aqueous phosphorus suspension containing 250 g of pulverulent red phosphorus were diluted with 250 ml of water, brought to a pH value of 4 by adding 5% strength $H_2SO_4$, and warmed to 60° C. After dropwise addition of a solution of 5.3 g of $Al_2(SO_4)_3 \cdot 18 H_2O$ in 50 ml of water, and of an emulsion of 1.0 g of a liquid, very low-viscosity epoxide resin A (®Beckopox EP 128 from Hoechst Aktiengesellschaft, Frankfurt/Main) having an epoxide equivalent weight of about 200 and a density, at 25° C., of 1.12 g/ml, and 1.0 g of a water-soluble, internally modified aliphatic polyamine hardener (®Beckopox VEH 2130 from Hoechst Aktiengesellschaft, Frankfurt/Main), having an H-equivalent weight of about 200 and a density, at 25° C., of 1.10 g/ml, in 50 ml of water, the suspension was brought to a pH-value of 5 by adding 5% strength by weight sodium hydroxide solution. Next, the suspension was stirred for 1 hour at 60° C., and then brought to a pH-value of 7 with 5% strength by weight sodium hydroxide solution. After stirring for a further 15 minutes, the mixture was filtered and the filter residue was washed with water and dried in a stream of nitrogen at 100° C. The proportion of aluminum hydroxide in the dried red phosphorus was 0.46% by weight and the proportion of epoxide resin was 0.68% by weight, based on the amount of red phosphorus employed.

The oxidation stability of the red phosphorus stabilized as described above was tested in accordance with the two test procedures described below.

Test 1

450 ml of water and 1 g of the pretreated red phosphorus were introduced into a three-necked flask equipped with a gas inlet tube, thermometer, reflux condenser and magnetic stirrer, the mixture was warmed to 80° C. and 10 liters of oxygen per hour were passed into the mixture, under agitation. The gas mixture which escaped via the reflux condenser and consisted of oxygen and hydrogen phosphide which had been produced, together with acids of phosphorus of various oxidation levels, by disproportionation of the red phosphorus, was led through two washbottles which were arranged one downstream of the other, and which each contained 100 ml of a 2.5% strength by weight aqueous mercury (II) chloride solution.

In this method, the phosphine reacted with the mercury (II) chloride in accordance with the following equation:

$$PH_3 + 3\ HgCl_2 \rightarrow P(HgCl)_3 + 3\ HCl$$

The amount of oxo-acids of phosphorus contained in the aqueous suspension of the red phosphorus, and the hydrochloric acid contained in the gas washbottles, served as an index of the oxidation stability of the red phosphorus. The contents of phosphorus acids and of hydrochloric acid were determined titrimetrically. The values calculated therefrom are shown in Table 1, columns A and B. Column A shows the amount of $PH_3$ (mg of $PH_3$ per gram of phosphorus per hour) formed during oxidation of the red phosphorus. The values in column B are index of the acidity of the aqueous phosphorus-containing suspension, resulting from the formation of phosphorus acids during oxidation of the phosphorus (mg of KOH per gram of phosphorus per hour).

Test 2

The oxidation stability was determined on the basis of Indian Standard "Specification of red phosphorus" (IS 2012-1961).

For this purpose, 5.0 g of red phosphorus was weighed out into a crystallizing dish of 50 mm diameter and the dish was stored in a closed glass vessel for 168 hours at 50° C. and 100% relative atmospheric humidity. The phosphine thereby formed was expelled from the glass vessel by means of a stream of air (10 l/h) and caused to react with 2.5% strength by weight mercury (II) chloride solution in a gas washbottle, and the amount of hydrochloric acid thereby formed was determined titrimetrically.

To determine the content of the various oxo-acids of phosphorus, the sample of phosphorus was transferred into a 250 ml beaker, 120 ml of water and 40 ml of n-propanol were added, and the mixture was heated to the boil for 10 minutes and then filtered. The quantitative analytical determination of the oxo-acids in the filtrate was then carried out by titration with 0.1 N NaOH up to the equivalent point for the 2nd titration stage, at pH 9.5.

The values calculated therefrom are shown in Table 2.

EXAMPLE 2

The procedure followed was analogous to Example 1, but 10.6 g of aluminum sulfate were used. The proportion of aluminum hydroxide in the dried red phosphorus was 0.92% by weight and the proportion of epoxide resin was 0.67% by weight. The values of the oxidation stability of the red phosphorus treated in this manner are shown in Tables 1 and 2.

EXAMPLE 3

The procedure followed was analogous to Example 1, but 1.1 g of aluminum sulfate were used. The proportion of aluminum hydroxide in the dried red phosphorus was 0.10% by weight and the proportion of epoxide resin was 0.72% by weight. The values of the oxidation stability of the red phosphorus treated in this manner are shown in Tables 1 and 2.

EXAMPLE 4

The procedure followed was analogous to Example 1, but 1.1 g of aluminum sulfate, 0.5 g of epoxide resin A and 0.5 g of hardener were used. The proportion of aluminum hydroxide in the dried red phosphorus was 0.11% by weight and the proportion of epoxide resin was 0.37% by weight. The values of the oxidation stability of the red phosphorus treated in this manner are shown in Tables 1 and 2.

EXAMPLE 5

The procedure was analogous to Example 1, but 1.0 g of a liquid, very low-viscosity epoxide resin B (®Beckopox VEP 22 from Hoechst Aktiengesellschaft, Frankfurt/Main) with an epoxide equivalent weight of about 195 and a density, at 25° C., of 1.11 g/ml, and 1.0 g of the hardener of Example 1 were used. The proportion of aluminum hydroxide in the dried red phosphorus was 0.46% by weight and the proportion of epoxide resin was 0.67% by weight. The values of the oxidation stability of the red phosphorus treated in this manner are shown in Tables 1 and 2.

EXAMPLE 6

The procedure was analogous to Example 5, but 10.6 g of aluminum sulfate were used. The proportion of aluminum hydroxide in the dried red phosphorus was 0.94% by weight and the proportion of epoxide resin was 0.68% by weight. The values of the oxidation stability of the red phosphorus treated in this manner are shown in Tables 1 and 2.

EXAMPLE 7

The procedure was analogous to Example 5, but 1.1 g of aluminum sulfate was used. The proportion of aluminum hydroxide in the dried red phosphorus was 0.11% by weight and the proportion of epoxide resin was 0.74% by weight. The values of the oxidation stability of the red phosphorus treated in this manner are shown in Tables 1 and 2.

EXAMPLE 8

The procedure was analogous to Example 5, but 1.1 g of aluminum sulfate, 0.5 of epoxide resin B and 0.5 g of hardener were used. The proportion of aluminum hydroxide in the dried red phosphorus was 0.11% by weight and the proportion of epoxide resin was 0.36% by weight. The values of the oxidation stability of the red phosphorus treated in this manner are shown in Tables 1 and 2.

EXAMPLE 9 (Comparative Example)

The procedure was analogous to Example 1 but no aluminum sulfate was used. The proportion of epoxide resin in the dried red phosphorus was 0.74% by weight. The values of the oxidation stability of the red phosphorus treated in this manner are shown in Tables 1 and 2.

EXAMPLE 10 (Comparative Example)

The procedure was analogous to Example 5, but no aluminum sulfate was used. The proportion of epoxide resin in the dried red phosphorus was 0.70% by weight. The values of the oxidation stability of the red phosphorus treated in this manner are shown in Tables 1 and 2.

Example 11 (Comparative Example)

The procedure was analogous to Example 1, but neither epoxide resin nor epoxide hardener was employed. The proportion of aluminum hydroxide in the dried red phosphorus was 0.48% by weight. The values of the oxidation stability of the red phosphorus treated in this manner are shown in Tables 1 and 2.

EXAMPLE 12 (Comparative Example)

The procedure was analogous to Example 2, but neither epoxide resin nor epoxide hardener was employed. The proportion of aluminum hydroxide in the dried red phosphorus was 0.92% by weight. The values of the oxidation stability of the red phosphorus treated in this manner are shown in Tables 1 and 2.

It follows from the data in Tables 1 and 2 that the aluminum hydroxide/epoxide resin stabilizer according to the invention is capable of achieving an improved stabilizing effect, with a smaller total amount of stabilizer, than with the use of aluminum hydroxide or epoxide resin alone.

TABLE 1

| Example | Stabilizer (% by weight) | Total amount of stabilizer (% by weight) | A (mg of $PH_3$/g × hour) | B (mg of KOH/g × hour) |
|---|---|---|---|---|
| 1 | 0.46% of $Al(OH)_3$ 0.68% of epoxide resin A | 1.14 | 0.04 | 0.8 |
| 2 | 0.92% of $(Al(OH)_3$ 0.67% of epoxide resin A | 1.59 | 0.04 | 0.7 |
| 3 | 0.10% of $Al(OH)_3$ 0.72% of epoxide resin A | 0.82 | 0.04 | 0.8 |
| 4 | 0.11% of $Al(OH)_3$ 0.37% of epoxide resin A | 0.48 | 0.06 | 1.0 |
| 5 | 0.46% of $Al(OH)_3$ 0.67% of epoxide resin B | 1.13 | 0.06 | 0.9 |
| 6 | 0.94% of $Al(OH)_3$ 0.68% of epoxide resin B | 1.62 | 0.05 | 0.9 |
| 7 | 0.11% of $Al(OH)_3$ 0.74% of eposide resin B | 0.85 | 0.05 | 0.8 |
| 8 | 0.11% of $Al(OH)_3$ 0.36% of epoxide resin B | 0.47 | 0.06 | 0.9 |
| 9 | 0.74% of epoxide resin A | 0.74 | 0.17 | 2.7 |
| 10 | 0.70% of epoxide resin B | 0.70 | 0.16 | 2.5 |
| 11 | 0.48% of $Al(OH)_3$ | 0.48 | 0.72 | 7.6 |
| 12 | 0.92% of $Al(OH)_3$ | 0.92 | 0.76 | 10.5 |

TABLE 2

| Example | Stabilizer (% by weight) | Total amount of stabilizer (% by weight) | $H_3PO_4$ (% by weight) | $PH_3$ (mg/g) |
|---|---|---|---|---|
| 1 | 0.46% by weight of $Al(OH)_3$ 0.48% by weight of epoxide resin A | 1.14 | 0.12 | <0.02 |
| 2 | 0.92% by weight of $Al(OH)_3$ 0.67% by weight of epoxide resin A | 1.59 | 0.05 | <0.02 |
| 3 | 0.10% by weight of $Al(OH)_3$ 0.72% by weight of epoxide resin A | 0.82 | 0.28 | <0.02 |
| 4 | 0.11% by weight of $Al(OH)_3$ 0.37% by weight of epoxide resin A | 0.48 | 0.27 | <0.02 |
| 5 | 0.46% by weight of $Al(OH)_3$ 0.67% by weight of epoxide resin B | 1.13 | 0.11 | <0.02 |
| 6 | 0.94% by weight of $Al(OH)_3$ 0.68% by weight of epoxide resin B | 1.62 | 0.06 | <0.02 |
| 7 | 0.11% by weight of $Al(OH)_3$ 0.74% by weight of epoxide resin B | 0.85 | 0.20 | <0.02 |
| 8 | 0.11% by weight of $Al(OH)_3$ 0.36% by weight of epoxide resin B | 0.47 | 0.31 | <0.02 |
| 9 | 0.74% by weight of epoxide resin A | 0.74 | 0.56 | <0.02 |
| 10 | 0.70% by weight of epoxide resin B | 0.70 | 0.62 | 0.02 |
| 11 | 0.48% by weight of $Al(OH)_3$ | 0.48 | 5.84 | 1.6 |
| 12 | 0.92% by weight of $Al(OH)_3$ | 0.92 | 2.99 | 0.6 |

We claim:

1. An improved stabilized pulverulent red phosphorus consisting of phosphorus particles having a particle size of at most about 2 mm, and an oxidation stabilizer enveloping the phosphorus particles in the form of a thin layer, the improved phosphorus containing
    (a) as the oxidation stabilizer a combination of aluminum hydroxide and a hardened epoxide resin system having an epoxide equivalent weight of about 170 to 500,
    (b) the oxidation stabilizer in a total proportion of 0.1–5% by weight, based on the amount of red phosphorus, and
    (c) the aluminum hydroxide in a proportion of about 0.01 to 3% by weight, and the epoxide resin in a proportion of about 0.09 to 4.99% by weight, based in each case on red phosphorus.

2. Red phosphorus as claimed in claim 1, wherein the epoxide resin is an epoxide-phenolic resin.

3. Red phosphorus as claimed in claim 1, wherein the epoxide resin is a reaction product of epichlorohydrin and 2,2-bis-(4-hydroxyphenyl)-propane (bisphenol A).

4. Red phosphorus as claimed in claim 1, wherein the epoxide resin is an epoxide resin ester.

5. A process for the manufacture of the stabilized pulverulent red phosphorus, consisting of phosphorus particles having a particle size of at most about 2 mm, and an oxidation stabilizer which envelops the phosphorus particles in the form of a thin layer, which comprises introducing a water-soluble aluminum salt and an aqueous or alcoholic solution or dispersion of an epoxide resin and of a hardener into an aqueous suspension of the red phosphorus, establishing a pH-value of about 5 to 9, stirring the mixture for 1 to 3 hours at a temperature of 20° to 90° C., with precipitation of the aluminum hydroxide and simultaneous hardening of the epoxide resin, filtering off the stabilized phosphorus and finally drying it at an elevated temperature.

6. The process as claimed in claim 5, wherein the epoxide resin is a liquid epoxide resin which has a very low to medium viscosity, is 100% reactive and is hardenable with water-soluble or water-emulsifiable hardeners.

7. The process as claimed in claim 5, wherein the epoxide resin is an unmodified, liquid 100% reactive reaction product of epichlorohydrin and bisphenol A, which is hardenable with water-soluble or water-emulsifiable hardeners.

8. The process as claimed in claim 5, wherein the epoxide resin employed is an aqueous epoxide-phenolic resin dispersion or water-emulsifiable 100% reactive epoxide resin ester, either of which is hardenable with water-soluble or water-emulsifiable hardeners.

9. The process as claimed in claim 5, wherein the hardener employed is a water-soluble, internally modified polyamine or water-emulsifiable polyaminoamide.

10. The process as claimed in claim 5, wherein the epoxide resins are hardened in aqueous phase at a temperature of 20°–90° C. and in a pH range of 5–9.

* * * * *